United States Patent [19]

Sehier et al.

[11] Patent Number: 5,285,482
[45] Date of Patent: Feb. 8, 1994

[54] TIMING RECOVERY DEVICE FOR RECEIVER INSTALLATION USING ADAPTIVE EQUALIZATION AND OVERSAMPLING ASSOCIATED WITH DIFFERENTIALLY COHERENT DEMODULATION

[75] Inventors: Philippe Sehier, Levallois Perret; Véronique Truelle, Paris, both of France

[73] Assignee: Alcatel Telspace, Nanterre Cedex, France

[21] Appl. No.: 988,330

[22] Filed: Dec. 9, 1992

[30] Foreign Application Priority Data

Dec. 19, 1991 [FR] France .................. 91 15802

[51] Int. Cl.⁵ .............................. H04L 7/00
[52] U.S. Cl. ............................ 375/106; 375/84; 375/100
[58] Field of Search .............. 375/14, 15, 56, 84, 375/106, 97, 38, 40, 100; 329/308

[56] References Cited

U.S. PATENT DOCUMENTS

| | | | |
|---|---|---|---|
| 3,758,870 | 9/1973 | Schmitt et al. | 375/84 |
| 3,794,921 | 2/1974 | Unkauf | 375/84 |
| 4,344,176 | 8/1982 | Qureshi | 375/15 |
| 4,896,336 | 1/1990 | Henely et al. | 329/308 |
| 4,941,155 | 7/1990 | Chuang et al. | 375/106 |
| 5,027,371 | 6/1991 | Sehier et al. | 375/15 |

OTHER PUBLICATIONS

IEEE Global Telecommunications Conference, vol. 2, Dec. 2, 1990, San Diego, U.S., pp. 923–927; Norm W. K. Lo et al: "Adaptive equalization and diversity combining for a mobile radio channel".

Proceedings of the IEEE, vol. 73, No. 9, Sep. 1, 1985, New York, U.S., pp. 1349–1387; Shahid U. H. Qureshi: "Adaptive Equalization".

*Primary Examiner*—Stephen Chin
*Attorney, Agent, or Firm*—Sughrue, Mion, Zinn, Macpeak & Seas

[57] ABSTRACT

A timing recovery device for receiver installations using oversampling and adaptive equalization in association with differentially coherent demodulation, applicable in particular to receivers operating in diversity mode, derives a transition coding signal from the output signal of the adaptive equalizer. Channel estimator circuits receive this coding signal and digital signals supplied by oversampling devices on the diversity channels. The timing error is calculated from signals supplied by the estimators. The error calculation circuit controls an oscillator which generates a clock signal corresponding to the recovered symbol timing rate.

5 Claims, 2 Drawing Sheets

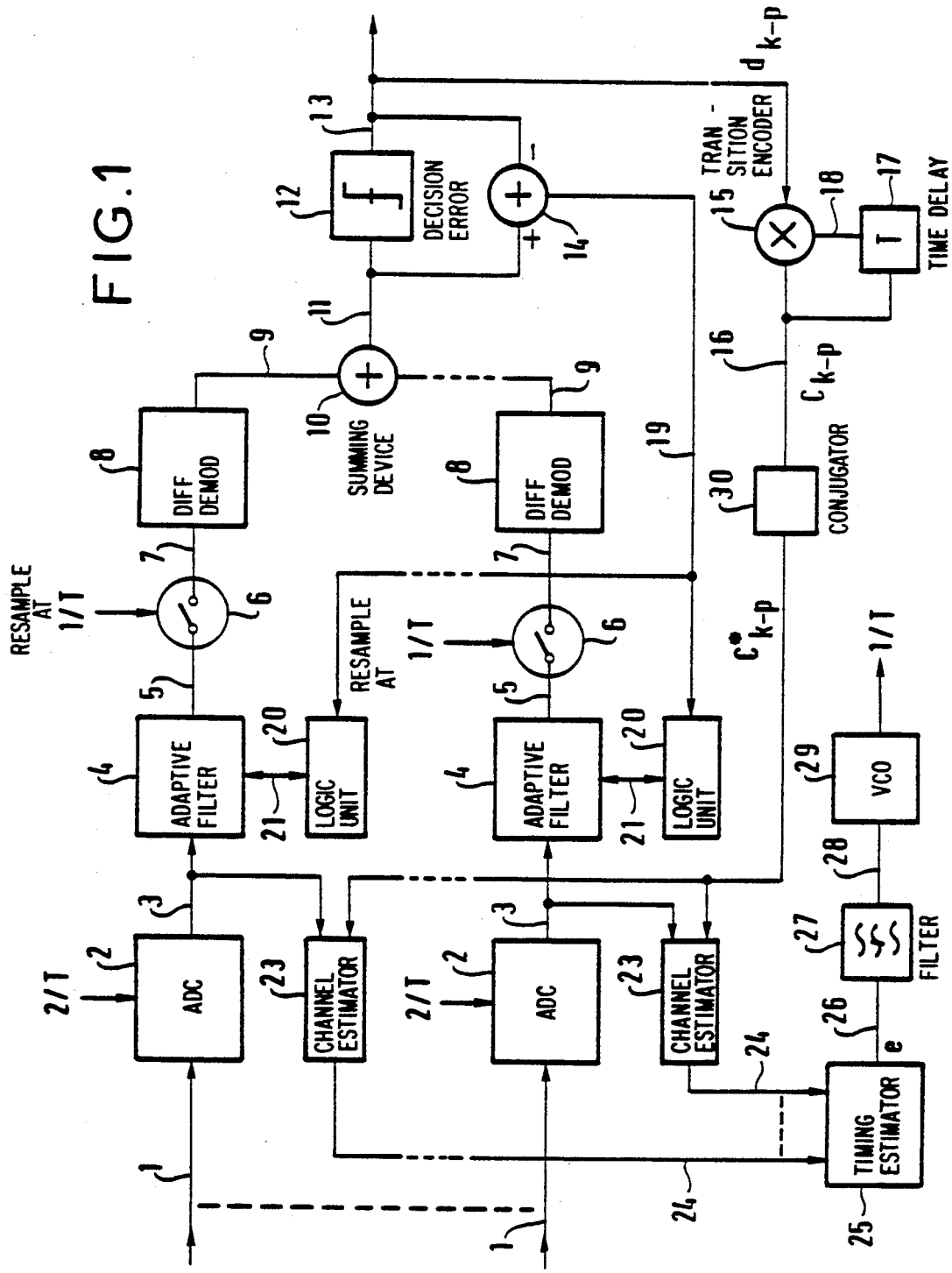

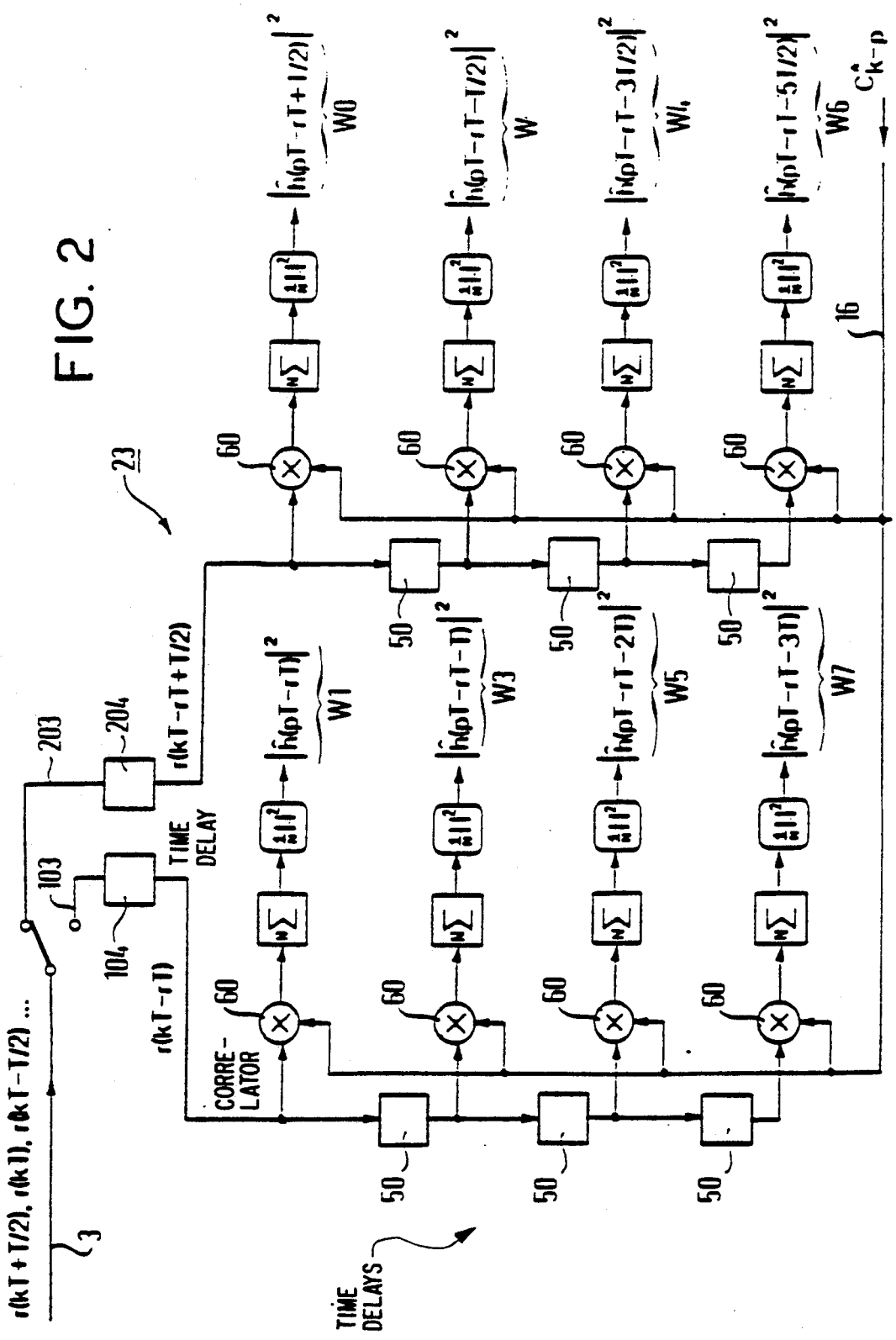

TIMING RECOVERY DEVICE FOR RECEIVER INSTALLATION USING ADAPTIVE EQUALIZATION AND OVERSAMPLING ASSOCIATED WITH DIFFERENTIALLY COHERENT DEMODULATION

BACKGROUND OF THE INVENTION

1. Field of the invention

The invention concerns a timing recovery device for receiver installations using adaptive equalization and oversampling associated with differentially coherent demodulation. It applies in particular to dispersive multipath digital data transmission causing intersymbol interference in the received data, for example digital microwave transmission on a long line of sight path or a tropospheric path. It is applicable to transmission systems which use differentially demodulatable linear modulation such as QPSK or MPSK and advantageously receiver installations which can operate in diversity mode.

2. Description of the prior art

The presence of intersymbol interference tends to degrade significantly the performance of the receiver installations used in digital microwave transmission. A known way to remedy this drawback in the case of coherent modulation is to use adaptive equalization by means of an adaptive filter whose function is to minimize intersymbol interference. In the systems that are the most widespread because they are the simplest the filter optimization criterion is the mean square error (which is to be minimized) and the filter coefficients are updated by the stochastic gradient algorithm.

A known way to improve further the performance of receiver installations using coherent demodulation and adaptive equalization is to use the diversity technique by including in each receive channel an adaptive equalization filter processing the received signal and to connect the output of the demodulator to a so-called decision feedback adaptive filter which processes the symbols decided on. In the case of coherent demodulation the filter coefficient adaptation algorithm is well known and many receiver installations have been implemented to date. One example of a receiver installation using diversity and adaptive equalization is described in U.S. Pat. No. 3,879,664.

The drawback of coherent demodulation is that the phase of the received signal must be estimated. This is particularly difficult because the paths in question cause fast variations in phase which can desynchronize the receiver.

One known solution to the problem of avoiding this estimation of the phase of the received signal is to use differentially coherent demodulation, more usually referred to as "differential demodulation". In this technique the previous sample is used as a phase reference for the signal sample being processed. A receiver installation using adaptive equalization in association with differential demodulation is described in French patent application FR-88 17507.

For receiver installations using adaptive equalization in association with differential demodulation the receiver clock or timebase must be synchronized to the transmitter timebase which controls the timing of data symbol transmission. Timing recovery devices are known which operate on the complex envelope of the received signal prior to equalization.

These known devices offer poor performance in the case of a dispersive transmission path, however.

Also, diversity mode operation of the receiver requires a combination of estimates and this makes the receiver complex. Furthermore, because sampling time control is independent of equalization, the sampling time set by the timing recovery device means that the equalizer cannot operate under optimum conditions. In particular, skipping of successive cycles (occurring after a particular time) tends to desynchronize the equalizer which makes it impossible to guarantee correct operation of the receiver in the long term.

This type of timing recovery device is suitable for equalizers with a low correction capacity for digital transmission via low dispersion paths but not equalizers for digital transmission via highly dispersive paths such as the tropospheric path.

Other known timing recovery devices use the coefficients of the transversal filters of the equalizer to correct the phase of the recovered timing on the basis of a filter group propagation time control criterion as described in the document IEEE Transaction of Communication, vol—COM-24, No 8, August 1976.

Timing recovery devices of this kind have various drawbacks:

For an equalizer operating in diversity mode and governed by a single error which is generated after combination, the group propagation time of each filter no longer conveys data and not all combinations of data are able to supply a usable recovered timing phase error estimate signal.

The acquisition range and bandwidth performance of the timing control loop are limited by the loop bandwidth of the equalizer which is just a few hertz. A timing recovery device of this kind requires the use of highly stable clocks if the performance of the equalizer is not to be degraded because the coeffients of the filters are varied to adapt to random variations in the phase of the clock.

One solution to making the adaptive equalizer relatively insensitive to the signal sampling time is to oversample the received signal prior to equalization at a frequency which is a multiple of the symbol frequency. Two times oversampling is most commonly used. In such a scheme it might be thought that timing recovery is no longer necessary because it is carried out by the equalizer.

However, this would require the use of an equalizer with an unlimited number of coefficients. This solution is not feasible because the number of filter coefficients must be finite.

An object of the invention is to remedy this drawback.

SUMMARY OF THE INVENTION

The invention consists in a timing recovery device for a receiver installation using oversampling and adaptive equalization in association with differentially coherent demodulation, said receiver installation producing an output signal representative of decided symbols reconstituted at the symbol timing rate in response to signals transmitted over a dispersive path and received on a plurality of diversity channels, which device comprises:

means responsive to said output signal to derive a transition coding signal, a plurality of channel estimator means each connected to an output of the oversampling means equipping each diversity channel, each channel estimator means further receiving the transition coding signal to produce a channel estimate signal, means responsive to said channel estimate signals to produce a symbol timing error signal, and means controlled by said error signal to produce a clock signal in corresponding relationship to the symbol timing rate.

Each channel estimator comprises q correlators and the timing error $e_t$ is given by the following equation:

$$e_t = \frac{\sum_{i=0}^{q-1}(q/2 - 1 - i)(W_i^1 + W_i^2 + \ldots W_i^n)}{\sum_{i=0}^{q-1} W_i^1 + W_i^2 + \ldots + W_i^n}$$

in which $W_i^1, W_i^2, \ldots, W_i^n$ represents the discrete values produced by the ith correlators of the channel estimator means for the respective receive channels 1, 2, ..., n.

Alternatively, the error $e_t$ is given by the equation:

$$e_t = \sum_{i=0}^{q-1}(q/2 - 1 - i)(W_i^1 + W_i^2 + \ldots + W_i^n)$$

The timing recovery device advantageously further comprises means for filtering the timing error signal.

The various features of the invention will now be explained in more detail in the context of one embodiment described by way of non-limiting example with reference to the appended drawings.

BRIEF DESCRIPTION OF THE DRAWINGS

FIG. 1 shows a receiver installation using oversampling and adaptive equalization in association with differentially coherent demodulation and including a timing recovery device in accordance with the invention.

FIG. 2 is a block diagram showing a channel estimator circuit which is part of a timing recovery device in accordance with the invention.

DETAILED DESCRIPTION OF THE INVENTION

Identical components in both figures are identified by the same reference number. Referring to FIG. 1, an analog signal transmitted by a transmitter over a dispersive path and relative to a diversity channel is received at 1 after being transposed into the baseband and filtered. The figure shows two identical diversity channels. The signals present at 1 are digitized on two signal paths in phase quadrature by two conventional analog/digital converters 2 which receive a sampling clock signal whose frequency is a multiple of the symbol frequency 1/T, two times oversampling being used in this instance. The digitized signals at 3 are complex samples well known from signal processing theory.

The successive complex samples present at 3 are and then passed to a conventional adaptive filter 4 known in itself. Each adaptive filter 4 is conventionally connected over a two-way link 21 to a logic unit 20 for calculating its coefficients.

The digital signal at the output 5 of each adaptive filter 4 is fed to a resampling device 6 to produce at 7 samples at the symbol timing rate 1/T which are then applied to the aforementioned differential demodulator 8.

The signals at the demodulator output 9 are then combined in a summing device 10 which is known in itself in the diversity technique.

The digital signal at the output 11 of this summing device 10 is then applied to the input of a decision circuit 12 whose output 13 supplies decided symbols at the recovered symbol timing rate, the output of the decision circuit constituting the output of the receiver installation. The respective signals at the decision circuit input and output 11 and 13 are subtracted in the conventional way in an error calculation device 14 the output 19 of which is connected to a data input of each of the aforementioned logic units 20.

The output 13 of the decision circuit 12 is connected to a transition encoder circuit 15 in the form of a multiplier whose output 16 is looped to its input via a time-delay circuit 17 whose time-delay is equal to the initial intersymbol interval T.

To go into more detail, the decided symbol entering the circuit 15 at time kT (where k is an integer) after a time-delay p applied by the adaptive filters 4 expressed as a number of symbol times is denoted $d_{K-p}$. The decided symbol leaving the circuit 15 at time kT is likewise denoted $c_{k-p}$. That which was output at time (k−1)T is denoted $c_{k-p-1}$. The operation of the circuit 15 may therefore be based on the following equation:

$$c_{k-p} = c_{k-p-1} \times d_{k-p}$$

The digital signal at 16 is applied to the input of a plurality of channel estimator circuits 23 each equipping one diversity channel. Each channel estimator circuit 23, to be described in detail hereinafter, also receives the digital signals at 3 produced by the associated analog/digital converter 2. Many channel estimator circuits have been described in the literature. A conventional channel estimator circuit is sufficient for the application discussed here and FIG. 2 shows one example.

Referring to this figure, the complex sample present at 3 and entering the circuit 23 at time kT + T/2 (2 is the oversampling factor) is denoted r(kT + T/2). That which entered at time kT is denoted r(kT) and that which entered at time kT − T/2 is denoted r(kT − T/2). These samples are divided into even samples 103 (present at a time which is an integer multiple of T) and odd samples 203, respectively.

The respective digital signals at 103 and 203 are delayed by a time 1T in respective time-delay circuits 104 and 204.

The channel estimator circuit 23 shown comprises eight correlators 60, of which four are connected in series via time-delay circuits 50 (each applying a time-delay equal to a symbol time) to the output of the time-delay circuit 104 and the other four of which are connected in series via other time-delay circuits to the output of the time-delay circuit 204, in a manner that is well known.

All the correlators 60 also receive the transition coding digital signal present at 16 after entry into the conjugator circuit 30 which produces the conjugate complex samples $c^*_{k-p}$.

By means of these correlators an estimator circuit of this kind generates at regular time intervals discrete values $W_i$ (i being the rank of the correlator) of the channel impulse response for the diversity channel to which it is assigned. In the example shown, the temporal pitch is equal to T/2 (the reciprocal of the received signal oversampling frequency).

Each channel estimator circuit therefore produces at its output eight digital signals whose discrete values are indicated in FIG. 2 by the following notation:

$$W_i = \left| \frac{1}{N} \sum_{k=1}^{N} r\left(kT = 1T + \frac{T}{2} - i\frac{T}{2}\right) \cdot c^*_{k-p} \right|^2$$

in which:
- i varies from 0 through q−1,
- q denotes the number of correlators in each channel estimator circuit (in this example q=8),
- l denotes the compensation time-delay of the circuits 104, 204,
- p denotes the group propagation time delay of the set of adaptive filters, and
- $c^*_{k-p}$ denotes the conjugate complex of $c_{k-p}$.

Note that $W_i$ represents the squared modulus of the estimated impulse response of the channel at a given time dependent on a specific correlator, which is conventional.

The digital signals generated at the output channel estimator circuits 23 and present at 24 are applied to a timing estimator circuit 25 which calculates a symbol timing error at regular time intervals which is given by the following expression:

$$e_t = \frac{\sum_{i=0}^{q-1}(q/2 - 1 - i)(W_i^1 + W_i^2 + \ldots W_i^n)}{\sum_{i=0}^{q-1} W_i^1 + W_i^2 + \ldots + W_i^n}$$

in which q denotes the number of correlators in each channel estimator circuit and n denotes the diversity channel to which relates a discrete value $W_i$ generated by an estimator circuit 23.

Calculation of the error $e_t$ may advantageously be simplified by eliminating the divisor in the above equation, which thus becomes:

$$e_t = \sum_{i=0}^{q-1}(q/2 - 1 - i)(W_i^1 + W_i^2 + \ldots + W_i^n)$$

A value of the error $e_t$ is generated at regular time intervals at the rate of one value per N symbol times T to produce a symbol timing error at 26 which is filtered in a conventional first order digital loop filter 27. The output signal of the filter 27 present at 28 controls an analog or digital signal type voltage-controlled oscillator 29 which produces the recovered symbol timing signal which has a period equal to T. As previously mentioned, this symbol timing signal controls the analog/digital converters and the resampling circuits 6 of the adaptive equalizer.

Of course, the invention is not limited to the embodiment described above and other variants may be put forward without departing from the scope of the invention.

There is claimed:

1. A timing recovery device for a receiver installation for recovering a clock timing from a received analog signal, said installation including oversampling means for generating digital samples by sampling said received analog signal in accordance with a sampling signal which is a multiple of a symbol frequency, means for adaptively equalizing said digital samples, and differentially coherent demodulation means for demodulating said digital samples, said receiver installation producing an output signal representative of decided symbols reconstituted at the symbol timing rate in accordance with a clock signal and in response to said received analog signals transmitted over a dispersive path and received on a plurality of diversity channels, which device comprises:
   - means responsive to said output signal to derive a transition coding signal,
   - a plurality of channel estimator means each connected to an output of the oversampling means in each diversity channel, each channel estimator means further receiving the transition coding signal to produce a channel estimate signal,
   - means responsive to said channel estimate signals to produce a symbol timing error signal, and
   - means responsive to said error signal to produce said clock signal having a predetermined relationship to the symbol timing rate.

2. Device according to claim 1 wherein each channel estimator means comprises q correlators, where q is an integer and the timing error $e_t$ is given by the following equation:

$$e_t = \frac{\sum_{i=0}^{q-1}(q/2 - 1 - i)(W_i^1 + W_i^2 + \ldots W_i^n)}{\sum_{i=0}^{q-1} W_i^1 + W_i^2 + \ldots + W_i^n}$$

in which $W_1^1, W_1^2, \ldots, W_1^n$ denotes discrete values produced by the ith correlators of the channel estimator means of respective receive channels 1, 2, ..., n.

3. Device according to claim 1 wherein each channel estimator module comprises q correlators, where q is an integer, and the timing error $e_t$ is given by the following equation:

$$e_t = \sum_{i=0}^{q-1}(q/2 - 1 - i)(W_i^1 + W_i^2 + \ldots + W_i^n)$$

in which $W_i^1, W_i^2, \ldots, W_i^n$ denote the discrete values produced by the ith correlators of the channel estimator means of the respective receive channels 1, 2, ... n.

4. Device according to claim 2 further comprising means for filtering said timing error signal.

5. Device according to claim 3 further comprising means for filtering said timing error signal.

* * * * *